United States Patent [19]

Koenst, Jr. et al.

[11] 4,038,351
[45] July 26, 1977

[54] METHOD OF CASTING TUBULAR POLYSULFONE ULTRAFILTRATION MEMBRANES IN SAND MODULES

[75] Inventors: John W. Koenst, Jr.; Edward Mitchell, both of Pittsburgh, Pa.

[73] Assignee: Union Carbide Corporation, New York, N.Y.

[21] Appl. No.: 507,506

[22] Filed: Sept. 19, 1974

[51] Int. Cl.² .................. B29C 23/00; B29D 7/10; B29D 27/04
[52] U.S. Cl. ...................... 264/45.1; 210/500 M; 264/46.6; 264/85; 264/269
[58] Field of Search .............. 264/46.6, 269, 349, 264/41, 45.1, 85, 49; 210/500 M; 260/34.2

[56] References Cited

U.S. PATENT DOCUMENTS

| 3,657,402 | 4/1972 | Stana et al. ............... 264/269 |
| 3,658,955 | 4/1972 | Chamberlin et al. ....... 210/500 M |
| 3,661,634 | 5/1972 | Riley et al. ............... 264/41 |
| 3,691,068 | 9/1972 | Cross ....................... 210/500 M |
| 3,709,841 | 1/1973 | Quentin .................... 210/500 M |
| 3,719,640 | 3/1973 | Lee et al. ................. 210/500 M |
| 3,734,897 | 5/1973 | Stoy ........................ 210/500 M |
| 3,855,122 | 12/1974 | Bourganel ................. 264/41 |
| 3,859,245 | 1/1975 | Stieler et al. ............. 260/34.2 |

OTHER PUBLICATIONS

Margerison et al., "An Introduction to Polymer Chemistry," Pergamon, N.Y., (1967) p. 101.
Walker et al., Principles of Chemical Engineering, McGraw-Hill, N.Y. (1937), pp. 586-593 & Humidity Chart.

Primary Examiner—Willard E. Hoag
Attorney, Agent, or Firm—William Raymond Moran

[57] ABSTRACT

An open pore liquid purification apparatus containing semipermeable membranes, is made by: (1) placing a module, made of bonded, resin coated filler particles, having a plurality of spaced circular bores therethrough, in a stationary vertical position, (2) placing a viscous casting composition into each of the bores, the composition containing 10 parts polysulfone resin and 10-40 parts of an organic solvent, the solvent being effective to homogeneously disperse and partly dissolve the polysulfone, (3) gravity dropping a casting bob, having a circular cross-section at its widest point, down through each bore to form a continuous film of casting composition on the inside of each bore, and then (4) immediately exposing the film to a low humidity atmosphere, and (5) contacting the film with a suitable leaching liquid, to form a polysulfone ultrafiltration membrane on the inside of each module bore; the membrane being resistant to solvents and operable at a pH of about 1 to 12 and a temperature of about 5° to 85° C.

17 Claims, 3 Drawing Figures

METHOD OF CASTING TUBULAR POLYSULFONE ULTRAFILTRATION MEMBRANES IN SAND MODULES

BACKGROUND OF THE INVENTION

This invention relates to an improved method of casting unitary, tubular, simipermeable polysulfone ultrafiltration membranes in place, in the interior feed bores of a support module made of bonded, resin coated filler particles, for use in ultrafiltration fluid purification systems.

Ultrafiltration is the name used to describe the process of filtering solute molecules at least one to two times larger than solvent molecules. Some large molecules can be filtered without developing significant osmotic pressure, and because of this, the operating pressures for ultrafiltration may be as low as 15 psi. Reverse osmosis, on the other hand, refers to the filtering of solutes of the same order of magnitude in size as the solvent, at minimum pressures of about 400 psi.

An ultrafiltration system has application in many areas. The areas of greatest present interest are making potable water from polluted water and cleaning up waste streams. Other applications include the concentration of food (orange juice, tomato juice, cheese whey, and syrups), and protein and paint solids removal.

Ultrafiltration fluid purification systems have taken on many forms, including plate and frame, hollow fine fiber, spiral wound and tubular types. The configuration which appears to have the greatest commercial appeal at the present time is the tubular type system. The typical tubular type system generally employs a simipermeable cellulose acetate membrane in the form of a long, straight tube containing an active osmotic skin. This cellulose acetate membrane can be drop cast, in situ, inside modules made of bonded, resin coated filler particles, as taught by Stana et al in U.S. Pat. No. 3,327,402.

The main difficulty with cellulose acetate membranes, however, is the preparation of a membrane strong enough to withstand the prolonged passage of high water flows without compacting; while still retarding the passage of selected ions or molecules. It is also known that cellulose acetate membrane applications are limited by their swelling, due to organic solvents, by their thermal instability and by their degradation in high pH environments.

H. K. Lonsdale in "Reverse Osmosis Membrane Research", Plenum Press 1972, taught direct drop casting, into a steel casting tube, of thin, porous, high strength, chemically resistant, polysulfone support linings for polyacrylic acid, cellulose acetate and cellulose nitrate reverse osmosis membranes. Baker, in U.S. Pat. No. 3,567,810, formed flat polysulfone reverse osmosis membrane films, by forced evaporation of solvent from the film in an oven at 50°-250° C. These films were formed on a glass substrate from 14 wt.% polysulfone, dissolved at 50°-80° C in combined acetone-dimethylsulfoxide solvent. Quentin, in U.S. Pat. No. 3,709,841, taught placing flat or tubular partially sulfonated polysulfone ion exchange membranes in water purification systems. The polysulfone was first partially sulfonated, wherein sulphonic radicals were substituted for benzene rings, by reaction with chlorosulphonic acid in 1,2 dichloroethane. The membrane was cast on a glass substrate from 3-13 wt.% sulphonated polysulfone dissolved in dimethylformamide at ambient temperature, and solvent force evaporated in an oven at 50° C.

The low solids polysulfone casting solution formed by heat dissolution, and the low solids sulfonated polysulfone casting solution formed by dissolution at ambient conditions, are unstable, tending to separate easily. They are not particularly suitable for drop casting into porous support modules having walls made of bonded, resin coated filler particles. In this type module, a particularly homogeneous, highly viscous composition, able to easily wet, penetrate, conform and adhere to the relatively rough casting surface is required.

SUMMARY OF THE INVENTION

Our method provides a simplified membrane-module system by casting a unitary, tubular, ultrafiltration membrane in place, inside a stationary support module. Briefly, our method consists of (1) placing an open pore module made of bonded, resin coated filler particles, having at least one circular bore through it, in a vertical position, (2) loading a membrane casting composition, preferably deaerated, having a viscosity of between about 2,000 and 80,000 cps., into each of the module bores. The composition will contain about 20 to 50 wt.% polysulfone resin in an organic solvent, the solvent being effective to homogeneously disperse and partly dissolve the polysulfone by mixing with continuous agitation in a low humidity atmosphere at between about 20°-40° C for about 24 to 192 hours, (3) gravity dropping a hydraulically stable, self-centering casting bob, having a circular cross-section at its widest point, at a speed up to 1 inch/second down through the bore containing the casting composition, to form a continuous film of casting composition on the inside of each module bore; the bores having an inside diameter between 0.02 and 0.12 inches greater than the diameter of the casting bob at its widest point, and then (4) immediately exposing the cast in place film to a low humidity atmosphere of up to about 50% relative humidity, and (5) contacting the cast film with a suitable leaching liquid in such a manner and for a length of time necessary to produce an effective ultrafiltration membrane in each of the module bores.

Our method is particularly suitable for multiple bore modules and eliminates several process steps by casting the membranes in place. It provides a membrane that is particularly compatible with the bonded, resin coated filler bore walls of the module; effectively wetting, penetrating and adhering to the relatively rough surface. The membrane functions effectively at temperatures up to about 85° C and a pH up to about 12.

BRIEF DESCRIPTION OF THE DRAWINGS

For a better understanding of the invention, reference may be made to the preferred embodiments, exemplary of the invention, shown in the accompanying drawings in which.

DESCRIPTION OF THE PREFERRED EMBODIMENTS

Figure 1:
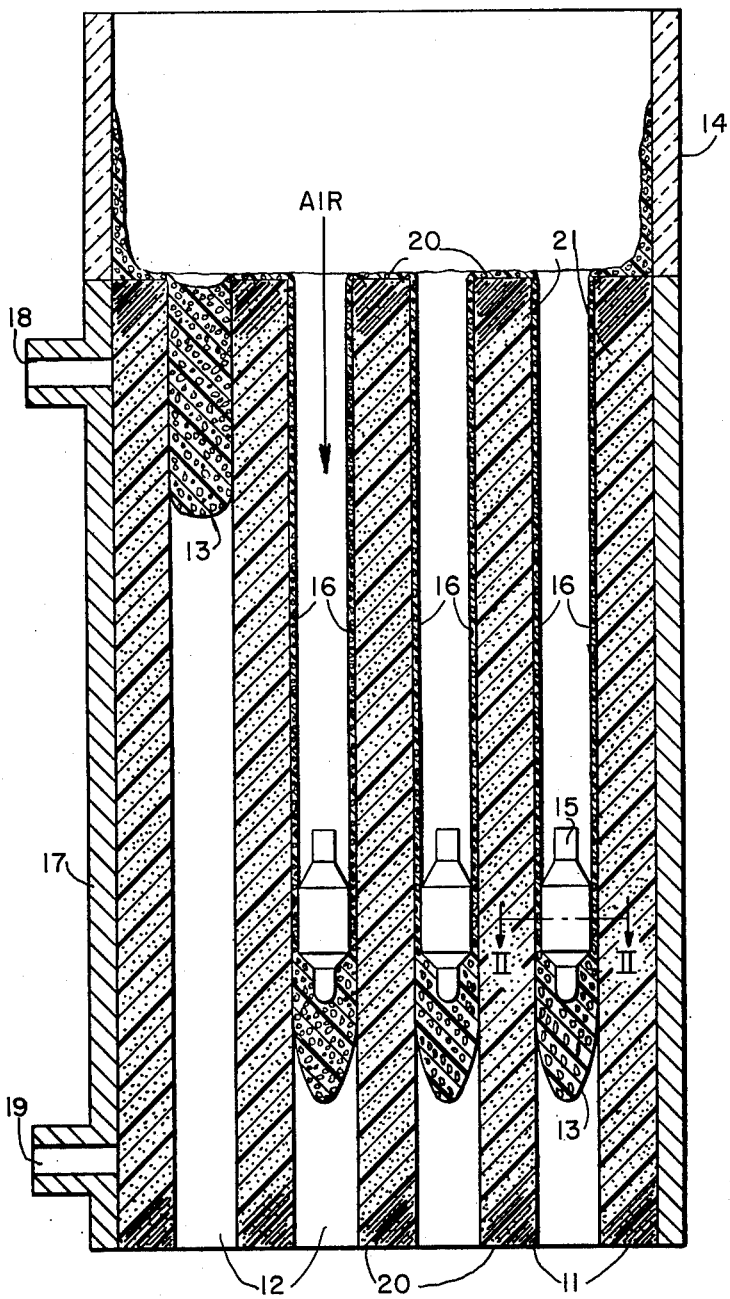
FIG. 1 shows a cross-sectional view of the membrane-module system, with the membrane being drop cast in the bores of an open pore module of bonded, resin coated filler particles.

Referring now to FIG. 1 of the drawings, an open pore support module 11, made of bonded, resin coated filler particles, having a plurality of spaced circular feed bores 12, generally in an axial configuration on the module terminal end, is shown.

Membrane casting composition 13 may be poured into and through collar 14 attached to the end of the vertically positioned module; or the collar, having a glass plate across the bottom, and containing settled, preferably deaerated casting composition, may be placed on the module top terminal end and the plate removed. The casting composition may also be poured through collars inserted into each of the feed bores, or inserted in the bores by a pressurized casting composition dispenser, as for example a grease gun. The initial placement of the casting composition is illustrated in one of the four bores shown in FIG. 1 before a casting bob is gravity dropped through it.

The casting composition, which contains polysulfone in a combination dispersion-solution form, fills the feed bores (between 50 and 200 ml. should be used per $\frac{1}{2}$ inches dia., 4 foot long bore). Hydraulically stable casting bobs 15, having circular cross sections at their widest point, and generally a round nosed front geometry, are gravity dropped, round nosed front first, simultaneously through each bore containing the casting composition. This forms the continuous cast in place films 16, as illustrated in three of the bores shown in FIG. 1. The bobs also create a partial vacuum and suck air into the bores behind them as shown. As can be seen, both the casting composition and the bobs are moving in the same downward direction. Also shown is an optional module reinforcement jacket 17 containing openings 18 and 19. The reinforcement jacket is generally made of thin metal such as stainless steel or aluminum; but it can also be made of fiberglass or plastic such as an epoxy resin, and can be used as additional support for the module in high pressure operations. The module terminal ends shown at 20 should be sealed with a composition containing epoxy resin 21, or by any other suitable means.

The casting compositions used in the present invention contain a polysulfone resin. In terms of its chemical makeup, the preferred polysulfone has the repeating structure shown below:

This material will have a molecular weight of between about 22,000–36,000, with a molecular weight of between about 30,000–36,000 preferred as providing a tougher, more puncture resistant membrane. The most distinctive feature of the backbone chain is the diphenylene sulfone group;

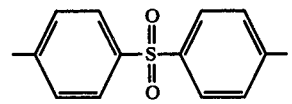

This group imparts excellent heat resistance. Flexibility in the backbone of the polymer, to impart toughness, is contributed by the ether linkage and augmented by the isopropylidene link.

Such aryl polymers can be prepared by the condensation of bisphenol with activated aromatic dihalides. In one method of making this preferred resin, 51.36 grams (0.225 mole) of high purity bisphenol A, [2,2-bis (4-hydroxyphenyl) propane], 115 grams of dimethyl sulfoxide and 330 grams of chlorobenzene are added to a reaction vessel and heated to about 70° C. Air is displaced from the system by flushing with nitrogen, and 0.45 moles of 50% aqueous sodium hydroxide is added; resulting in two liquid phases: one chlorobenzene and the other a disodium salt dissolved in aqueous dimethyl sulfoxide. The system is brought to reflux using a fractionating column. Water is removed and the chlorobenzene that codistills is continuously returned until the temperature reaches 140° C; at which point the disodium salt of bisphenol A appears as a precipitate.

A 50% solution of 64.61 grams (0.225 mole) of 4,4'-dichlorodiphenyl sulfone in dry chlorobenzene, maintained at 110° C, is then added over a 10 minute period; the excess solvent being allowed to distill at a rate sufficient to hold the material temperature at about 160° C. When all the sulfone has been added, polymerization is continued until the desired degree of polymerization is reached:

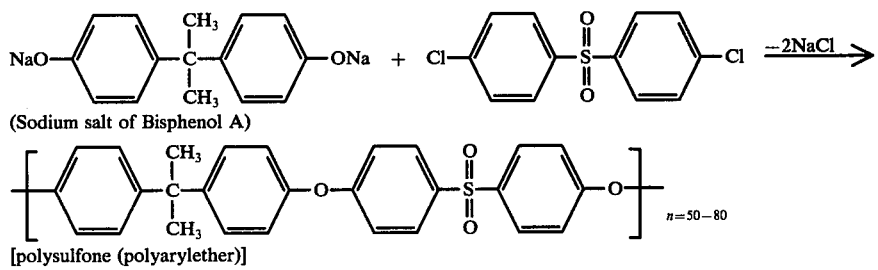

(Sodium salt of Bisphenol A)

[polysulfone (polyarylether)]

where $n$ is the monomer number.

Further details of preparation can be found in an article by R. H. Johnson et al in the Journal of Polymer Science, Part A-1, Vol. 5, pp. 2375–2395 (1967) herein incorporated by reference.

One of the major problems in developing a polysulfone membrane system that would be compatible with the preferred sand support module, was finding a suit- (I)

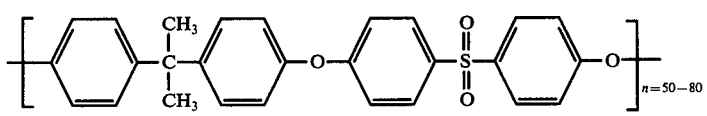

able solvent system that would be effective for drop casting techniques. The solvents selected were chosen on the basis of membrane transport properties, the ability to form a homogeneous dispersion-solution with over about 20 wt.% polysolfone resin to provide a suitably viscous composition having good sand wettability, and compatibility with the phenolic, epoxy or other type resin used in the sand module. Solvents found particularly useful were strong polor organic solvents such as 4-butyrolactone, methylene chloride, methyl cellosolve, N,N-dimethylformamide and their mixtures, with N,N-dimethylformamide being preferred. These solvents are effective to dissolve about 30-70 wt.% of the polysulfone resin and form a homogeneous dispersion with the remaining 30-70 wt.% undissolved polysulfone resin.

Polysulfone absorbs up to 0.3 wt.% atmospheric moisture in storage. The polysulfone should be dried before it is used, i.e. the maximum moisture content can only be up to about 0.15 wt.%, otherwise bubbling may occur in the final polysulfone membrane. The weight ratio of polysulfone to solvent is critical in providing a casting composition compatible with the support used in the method of this invention. The polysulfone resin must constitute between 20-50 wt.% of the casting composition. About 10-40 parts and preferably 25-35 parts of suitable solvent will be added per 10 parts polysulfone resin. The composition will not uniformly coat the interior of the module bores and streaking will result with possible membrane puncture during high pressure operation if less than 20 wt.% polysulfone is used. Over 50 wt.% polysulfone provides a composition too thick to effectively cast in the module feed bores.

The organic solvent used in this method must be one effective to homogeneously disperse and partly dissolve the polysulfone by gently mixing. The mixing may be accomplished in a rotating ball mill or other suitable mixing means, for a time period of about 24-192 hours, preferably 120-168 hours, at a temperature of between about 20°-40° C, in an atmosphere having up to about 50% but generally 1-50% relative humidity. The viscosity of the resulting homogeneous polysulfone dispersion in solvent must be between about 2,000-80,000 cp, preferably 15,000-35,000 cp at 25° C, in order to provide a suitable drop casting composition for the particular resin bonded filler module used as the membrane support.

The relative humidity in the dispersion mixing step must be kept below about 50%, or the moisture picked up by the polysulfone may cause membrane bubbling. Preferably, the container used in mixing will be completely filled and sealed, essentially eliminating incorporation of moisture from the air into the composition. The mixing time must be of a duration effective to provide a relatively homogeneous composition of suitable viscosity. The mixture must not be heated over about 40° C, as this tends to cause the polysulfone to form an unstable solution. Generally, the casting composition made by this method will remain stable without separation for up to about 36 hours, although it is preferably used within 24 hours and stored during that period in a low humidity environment.

The porous support module 11 contains voids or pores between the resin coated filler particles, allowing egress of pure water which has passed through the ultrafiltration membrane supported by the inside of each feed bore wall. A thin film of resin bonds each filler particle to the adjacent particles. The type and amount of resin used, the size of the filler particles, and the wall thickness can be adjusted to give a considerable range in the strength and porosity of the resultant module.

The finely divided filler particles that can be used in the module may be spherical, oval, cubical, or of other irregular configuration. Some examples of suitable inorganic filler particles are foundry sand, silica, silicon carbide, zircon, quartz, alumina, beryl, glass, limestone, magnesium aluminum silicate, calcium silicate, sillimanite ($AL_2O_3 \cdot SiO_2$), or any other rigid filler with a granular structure that is compatible with the resin system it is used with. Especially suitable fillers for lightweight module construction are hollow spherical plastic or glass beads, ground pumice stone and the like.

The preferred average particle size range of fillers for use in the support module construction is between about 40 and 250 microns, although the outer limits are between about 30 and 500 microns. Below 30 microns, the resin-filler support module lacks the desired porosity for low resistance to water flow, and above 500 microns, the module bore wall does not properly support the membrane and may allow membrane puncture at high pressures.

The weight percent resin that can be used to coat the filler particles used to make the modules of this invention will vary depending upon the type filler, its fineness and density. For example, the weight percent resin will range from about 2 to 18 percent of the filler particle weight when foundry sand is used as the module filler constituent, and 1 to 10 percent when zircon is used as the filler. The lightweight fillers will cause correspondingly higher weight percent resin values. On a volume basis the range would be about 4 to 32 percent resin for the fillers enumerated. Above these ranges the resin will tend to clog up the pores between the filler particles in the tube causing poor effusion of the pure water. Below these ranges the support tube will not be strong enough for the pressures required in this water purification process.

A variety of resins can be used to coat the filler particles in the module, but phenolic resins are preferred because they can be bought cheaply and in readily usable form. Phenolic resins are well known in the art and are thoroughly discussed in Megson, Phenolic Resin Chemistry, Academic Press, 1958, particularly chapter 3. They are conventionally obtained by reacting a phenolic substance such as phenol itself or substituted phenols such as cresols, xylenols, or butyl phenol with an aldehyde such as formaldehyde, propionaldehyde, acetaldehyde, benzaldehyde or furfuryl.

Other resins well known in the art which may be used as the coating and bonding agent in the resin bonded filler module, and which are compatible with the solvent used in the casting composition include: polyglycidyl ethers (see Lee and Nevill, Handbook of Epoxy Resins, McGraw Hill, 1966, particularly chapter 2), and polyesters and allyl resins (see Bjorksten, Polyesters And Their Applications, Reinhold Publishing Corporation, 1956, pages 1-34).

The application of any liquid or slurry composition as a film to a particulate porous surface will result in the liquid being sucked into the pores due to capillary action. The degree to which this capillary action will thin the film is a function of the thickness of the composition initially placed on the surface, the size of the particles, resistance to flow of the composition, surface tension between porous media and the composition, and the time in which this capillary action is allowed to take place.

We found that successfully drop casting unitary membranes in place, in support modules made of bonded, resin coated filler particles, using our particular polysulfone casting dispersion-solution, required critical parameters as regards casting bob design tolerances, casting bob speed, filler particle size and filler to resin ratios in the modules.

Both the thickness of the fresh cast film and the time it is exposed to the capillary action are a function of casting bob design tolerances. The film thickness is controlled by the clearance between the widest point of the casting bob and the inside of the feed tube bore walls. The film capillary exposure time is a function of the casting bob speed as it gravity drops through the viscous casting composition in the bore. The casting bob speed is controlled by the clearance between the casting bob and the feed bore sides, the length of the widest portion of the bob, the weight of the bob, the quantity of casting composition pushed ahead of the bob, and the casting composition viscosity.

We found that smooth uniform membranes resulted with a casting bob having a hydraulically stable self-centering geometry, with a round cross-section at its widest point. The bob should have an outer diameter between 0.02 and 0.12 inches less than the inside diameter of the module bore, i.e., the inside diameter of the module bore must be between 0.02 and 0.12 inches greater than the diameter of the casting bob at its widest point. A clearance greater than 0.12 inches left a film so thick that it began to flow after the casting bob had passed, leaving an uneven surface. A clearance less than 0.02 inches exposed sand particles in some places, leaving a non-continuous membrane. The preferred casting bob dimensional range for use in this invention is an outer bob diameter 0.03 to 0.06 inches smaller than the inner diameter of the module bore. We found that even if the module bore was not completely circular, that these tolerances between outer bob diameter and the closest inner bore surfaces produced excellent membranes; the surface tension of the casting composition making the film conform to the bore geometry.

Figure 2:
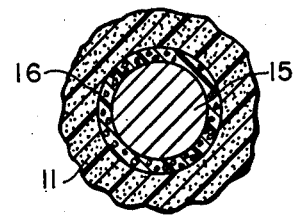
FIG. 2 shows a cross section of the casting bob and support module bore of the membrane-module system of FIG. 1, taken along the line 2—2.

As shown in FIG. 2, a cross-section along line 2—2 in FIG. 1, the film is batch cast in the annulus between the inside surface of the support module bore and the widest circular surface of the casting bob as the bob drops down through the bore containing the casting composition. The bob passes through the casting composition; pushing the casting composition in front of it and around it and creating a partial vacuum drawing air into the bores behind it. The film thickness will be aproximately one-half the difference between the inner diameter of the support module bore and the outer diameter of the widest point of the casting bob.

Casting bob speeds greater than about 0.325 inches/sec., for modules having a particle size range between about 40 and 350 microns and ½ inch bores, resulted in the casting bob pushing excess amounts of casting composition into the sand feed bore walls. This excess casting composition would then ooze out of the sand after the bob had passed, tending to give an uneven membrane surface. For modules having ½ inch cores and smaller filler particles, ranging between 40 and 100 microns, with resulting smoother bore surfaces, casting bob speeds up to 1 inch/second are possible and will produce excellent membranes. Preferred casting bob velocities were between about 0.20 and 0.30 inches/sec., for modules having about ½ inch bores made of resin coated sand.

We found that a casting bob havig a round-nosed front geometry gave about twice the speed as a flat-nosed bob of the same weight. The hydraulically stable casting bob design, which we used to cast ½ inch diameter membranes, consisted of a 2 ounce, three inch long, one quarter inch diameter tungsten rod having a round-nosed front sheathed with a circular stainless steel mid-section. The casting bob should weigh between about 1.5 and 2.5 ounces in order to give satisfactory results with casting compositions of about 15,000 to 35,000 cps. The casting bob weight necessary to achieve a satisfactory membrane was found to be a function of the diameter of the membrane to be cast and the design of the casting bob. For membranes substantially larger or smaller than ½ inch diameter the weight of the bob can be varied to provide the bob speed necessary to produce satisfactory membranes.

We found that during the casting operation, the module bores should be saturated with acetone or any other organic solvent effective to provide a low humidity atmosphere in the bores. This helps to reduce the rate of solvent evaporation and dry out during the casting operation, and maintains a low humidity atmosphere. The low humidity atmosphere helps control the air dry time and prevents defects caused by too fast a formation of the membrane. The solvent can be sprayed by any suitable means into the bores, or a solvent saturated material laid across the bore ends after the bobs have been released to effect this result, and/or the casting bob can be dipped in solvent before being dropped through the bores. This step is necessary to provide satisfactory membranes. Enough solvent or other type composition, or other humidity reducing means, should be used to be effective to maintain an atmosphere containing up to about 50% but generally 1 to 50% and preferably 1–20% relative humidity in the bores during casting. The relative humidity in this step which is optional before casting but necessary during casting, must be kept below about 50% or the moisture picked up by the polysulfonate may cause membrane bubbling.

At the end of a run the excess casting composition and the casting bob can be caught in a reservoir. Afterwards, air can be circulated slowly past the freshly cast film for about 1 to 150 seconds. After the air contact step, the module, with the cast film within the bore walls, is immersed in a leaching bath. The leaching bath may contain water, water-organic such as water with up to about 5 wt.% ethanol, acetone or formamide or water-inorganic such as water with up to about 10 wt.% water soluble salt such as NaCl or KCl, or other suitable liquid effective to leach solvent from the film and form a semi-permeable membrane at a temperature of between about −5° to 25° C. The leaching liquid is preferably deaerated.

We found that one possible source of pinholes in the membrane was the attachment of air bubbles during the gellation step. The module therefore should be continuously lowered into a leaching bath which is deaerated, in order to produce a uniform membrane surface. Air can be introduced into the leaching liquid by the chiller used to keep the bath cold and any commercial deaerator used in conjunction with the chiller will serve the purpose of deaeration. It is also advisable to close jacket opening 19 shown in FIG. 1, and attach an air hose to opening 18 leading out of the leaching bath, so that there is no chance of water pressure collapsing the membranes near the top terminal end 20 of the module.

The module is left in the leaching bath between about 10 and 90 minutes. During this time the solvent is leached from the film by the leach water, the film shrinks in thickness, gels and forms a thin porous membrane structure. The membrane will generally be about 5-20 mils thick and contain foraminous passageways therethrough, providing a porosity of about 20-60%. The side exposed to air will generally be more dense than the side next to the bore wall. The membrane, if it is properly cast, remains intact, adhering strongly to the porous sand module feed bore walls.

We found that almost 100% reliability could be achieved if the cast module terminal ends have no rough edges and the loose sand in each module bore is blown out with compressed air. It is also very important that the terminal ends are sealed with a suitable plastic or other type flange or with a suitable polymeric material. Suitable materials, such as an epoxy resin, or a combination epoxy-diglycidyl ether of an aliphatic polyglycol-amidopolyamine sealant may be brushed on or cast to provide an airwatertight seal, as taught in U.S. Pat. No. 3,773,181, herein incorporated by reference. This seal is particularly important, and if not maintained, air is forced through the back side of the membrane, because of displacement by water, rupturing the membrane.

We found that we could reduce the possibility of air bubbles forming in the cast film as the bob pushes through the casting solution in the porous module bores, by letting the freshly prepared casting solution sit in an open container for about ¼-6 hours, to outgas or deaerate it, before placing it in the module bores. After such deaeration, the top 10% of the composition, exposed to the atmosphere should not be allowed to flow into the module bores.

Figure 3:
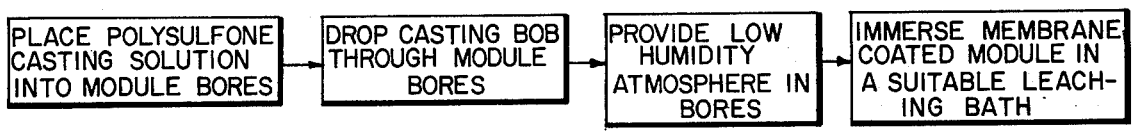
FIG. 3 shows a flow diagram of the method of this invention.

Our method has the advantages of eliminating the costly, time consuming and very complicated step of inserting already cast tubular membranes into their support structures in an ultrafiltration apparatus. Our method shown in diagram form in FIG. 3 and illustrated in the specific examples below, produces excellent cast in place reverse osmosis-ultrafiltration membranes resistant to solvents, high temperatures and caustic materials.

EXAMPLE 1

A membrane casting composition was made by placing 25 grams of dried polysulfone (polyarylether) resin, having a moisture content of about 0.08 wt.% and a molecular weight of about 27,000-36,000 (sold under the Tradename Bakelite P3500 by Union Carbide Corp.) and 75 grams N,N-dimethylformamide in a paint container, working in an atmosphere having a relative humidity below about 50%. The container was filled and sealed, and gently rotated on a ball mill machine for about 144 hours at 25° C. The polysulfone particles were allowed to disperse and partly dissolve without introduction of ball bearings, and any void space in the container was an atmosphere having a relative humidity of below about 50%. The resulting mixture was a substantially homogeneous dispersion-solution of polysulfone resin particles having a viscosity of about 20,000 cp at 25° C and a weight ratio of 30 parts solvent per 10 parts polysulfone. About 50 wt.% of the polysulfone resin was dissolved in the solvent. This composition was found to remain stable without separation for a 24 hour period.

A 4 foot long 3.75 diameter sand module, having 18 axially disposed, circular feed bores and a 4 foot long 1 inch diameter sand module having one circular feed bore, both modules contained within a one-eighth inch thick stainless steel jacket, were used as the membrane supports. The modules were composed of foundry sand having an average particle size of about 150 microns, which was resin coated and bonded together by phenolic resin having a viscosity at 25° C of 4,200 cp and a solids content at 135° C of 67% (sold commercially by Hooker Chemical Corporation under trade name Durez Phenolic Resin 18115). The weight percent resin was about 6 percent of the filler particle weight. The terminal ends of the sand module were filed flat, the loose sand in the bores blown out with compressed air, and then the module was placed in a stationary vertical position.

Glass containers with the casting composition (100 ml used per bore) were placed on the top of the modules. The casting solution was allowed to settle and deaerate for about one-half hour after mixing. The containers had flat plate bottoms which were removed and the casting composition poured into the module bores. After about three-fourths of the viscous casting composition had dropped down into the feed bores within the sand module, the containers were removed and acetone wet casting bobs were simultaneously dropped, round-nosed front first, down through each feed bore, and through the casting composition; pushing the casting composition in front of it and around it, in the annulus between the bore wall and bob, leaving behind a film of casting composition about 20 mils (0.020 inches) thick, adhering to the feed bore walls. After the casting bobs were dropped into the bores an acetone saturated towel was placed over the terminal end of the module and acetone saturated air was drawn into the bores as the bobs descended down the bores. This maintained a low humidity atmosphere of about 5-15% in the bores during casting. The excess composition and the casting bobs were caught in a reservoir. The casting run took approximately 3.5 to 4 minutes.

The inside diameter of the feed bores in both modules was 0.50 inches. The casting bobs were made from a three inch long, one quarter inch diameter tungsten rod. The rods had a round-nosed front and were sheated with a stainless steel mid-section 0.463 inches in diameter at its widest point. The mid-section was 1.25 inches long where it was attached to the rod and 0.125 inches long at the 0.463 maximum diameter (widest point of the casting bob). This casting bob had an outside diameter 0.037 inches smaller than the inside diameter of the feed bores and weighed approximately 2 oz. The casting bob velocities ranged from 0.243 to 0.291 inches/sec. with the average being 0.273 inches/sec. Gravity was the sole downward force involved in casting, and the casting bobs were designed to give the optimum velocity through the casting solution for optimum film casting in the sand module environment.

The sand modules with the cast film in each of the feed bores were allowed to air dry for about 40 seconds during transport to the leaching bath. The modules were then immersed by continuously lowering them into a leaching bath containing deaerated ice water at 1° C. The modules were left in the bath for 30 minutes. This leached the N,N-dimethylformamide organic solvent from the cast film and formed unitary, porous, thin, ultrafiltration membranes in each of the bores. The initial film thickness was about 20 mils (0.020 inches), due to casting solution penetration into the porous, resin coated feed bore walls. During leaching, the membranes shrank to their final thickness of about 15 mils (0.015 inches). They were firmly attached and did not separate from the feed bore walls during leaching, due to their excellent wetting and impregnation of the sand walls during the casting operation. The cast in place membranes were about 40% porous, tough, smooth and uniform.

The singlebore jacketed module containing the cast in place ultrafiltration membrane was tested on feed containing black anionic paint having a pH = 8–10. The module was operated at 120 psig with an operating temperature of 27° C and a flow rate of 2.5 gallons per minute. Results showed 25 gallons per day per square foot of membrane surface (gpd/ft.$^2$) pure water flux, at a 99+% latex particle rejection rate. The black paint initially had a conductivity of about 2210 microhms, while the clear permeate water had a conductivity of about 950 microhms, showing a large percentage of salts were also removed.

EXAMPLE 2

Similarly, compositions of 20 wt.% and 30 wt.% Bakelite P3700 polysulfone resin in N,N-dimethylformamide, were dispersion-mixed, cast and tested in a single bore module under the same conditions as in EXAMPLE 1, with results as shown in Table 1 below:

TABLE 1

| wt.% polysulfone | gpd/ft.$^2$ | % rejection latex | microhms feed | product |
|---|---|---|---|---|
| 20 | 30 | 99+ | 2210 | 1170 |
| 30 | 3 | 99+ | 2210 | 975 |

These results show excellent particle rejection for both membranes, with adequate ion removal for the 20 wt.% membrane and adequate pure water flux for the 30 wt.% membrane. Both membranes were uniform and did not streak.

EXAMPLE 3

Similarly, a composition of 27 wt.% Bakelite P3700 polysulfone resin in N,N-dimethylformamide was dispersion mixed and cast in an 18 bore module under the same conditions as in EXAMPLE 1. The sand module was terminal end sealed with cast epoxy resin to provide an air-water tight seal against suitable flanges in a reverse osmosis apparatus as described in U.S. Pat. No. 3,712,473. The feed was tap water and the module was operated at 100 psig. Results showed 100 gpd/ft.$^2$ initial pure water flux at a 13% salt rejection rate. These results show that these ultrafiltration modules are particularly useful for removing suspended solids and salts from feed solutions and in sewage applications.

We claim as our invention:

1. A method of casting unitary, tubular ultrafiltration membranes in place in the feed bores of an open pore module made of filler particles bonded by a thermosetting resin, said method comprising the steps of:
   1. placing said module in a stationary vertical position,
   2. placing a casting composition into each of the bores within the module; said composition, containing a combination dispersion-solution of 10 parts of polysulfone resin having a moisture content of up to about 0.15 wt.% in about 10–40 parts of a polar organic solvent, formed by mixing polysulfone resin and solvent in a low humidity atmosphere of up to about 50% relative humidity for about 24 to 192 hours to form a substantially homogeneous combination dispersion-solution having a viscosity of between about 2,000–80,000 cp at 25° C and containing about 30–70 wt.% undissolved polysulfone resin,
   3. gravity dropping a casting bob having a hydraulically stable geometry and a circular cross-section at its widest point down through the bore containing the casting composition at a speed less than 1 inch/second to form a continuous film of casting composition on the inside of each bore, said bore having an inside diameter between about 0.02 and 0.12 inches greater than the diameter of the bob at its widest point, introducing vapors of an organic solvent other than said polar organic solvent into said bores during the formation of said film on the inside of each of said bores to maintain a low humidity atmosphere of up to about 50% relative humidity in contact with the cast in place film during casting in the bores, and then
   4. allowing air to contact the film followed by contacting the film with a leaching liquid selected from the group consisting of water, water organic and water inorganic effective to leach solvent from the film to form a membrane on the inside of each module bore.

2. The method of claim 1, wherein the module has flat terminal ends which are sealed to provide an effective air-water tight seal, the casting composition is allowed to deaerate in an open container for about ¼–6 hours before step (2), the polysulfone resin and solvent are mixed at a temperature between about 20°–40° C and the polysulfone has a molecular weight between about 22,000 and 36,000. effective air-water tight seal, the casting composition is allowed to deaerate in an open container for about ¼–6 hours before step (2), the polysulfone resin and solvent are mixed at a temperature between about 20°–40° C and the polysulfone has a molecular weight between about 22,000 and 36,000.

3. The method of claim 1, wherein the solvent is selected from the group consisting of N,N-dimethylformamide, 4-butyrolactone, methylene chloride, methyl cellosolve and mixtures thereof, the polysulfone and solvent are mixed in a sealed container, and in step (3) the bores are saturated with a solvent effective to maintain an atmosphere within the bores having a relative humidity of up to about 20%.

4. The method of claim 3 wherein the open pore module comprises filler particles having an average particle size range between about 40 and 100 microns.

5. The method of claim 3 wherein the resin coating the filler particles is selected from the group consisting of phenolics, polyglycidyl ethers, polyesters, and allyl resins and air is allowed to contact the film in step (4) for about 1 to 150 seconds.

6. The method of claim 3 wherein the casting bob is gravity dropped at a speed up to about 0.325 inches/second and the open pore module comprises filler particles having an average particle size range between about 30 and 500 microns.

7. The method of claim 3 wherein the casting bob is gravity dropped at a speed up to about 0.325 inches/second and the open pore module comprises filler particles having an average particle size range between about 40 and 350 microns.

8. The method of claim 6 wherein the film is contacted with a leaching liquid by immersing the module by continuously lowering it into a leaching bath containing deaerated leaching liquid.

9. The method of claim 6 wherein the open pore module comprises resin coated foundry sand particles with a weight-percent range from about 2 to 18 percent of the sand particle weight.

10. The method of claim 9 wherein the casting composition has a viscosity between about 15,000 and 35,000 cp., the bore diameters are about one-half inch, and the casting bob weighs between about 1.5 and 2.5 ounces.

11. The method of claim 10 wherein the casting bob is gravity dropped at a speed between about 0.20 and 0.30 inches/second and the casting bob has a round-nosed front geometry.

12. A method of casting unitary, tubular ultrafiltration membranes in place in the feed bores of an open pore module made of filler particles bonded by a thermosetting resin, said method comprising the steps of:
  1. placing the module in a stationary vertical position, and then
  2. placing a deaerated casting composition consisting essentially of a combination dispersion-solution of 10 parts of polysulfone resin with a molecular weight between about 22,000 and 36,000 and a moisture content of up to about 0.15 wt.% in about 10-40 parts of an organic solvent selected from the group consisting of N,N-dimethylformamide, 4-butyrolactone, methyl chloride, methyl cellosolve and mixtures thereof into each of the bores within the module, the composition formed by mixing the polysulfone resin and solvent in a low humidity atmosphere of up to about 50% relative humidity for about 24 to 192 hours at a temperature of between about 20°-40° C to form a substantially homogeneous combination dispersion solution having a viscosity of between about 2,000–80,000 cp at 25° C and containing about 30–70 wt.% undissolved polysulfone resin, and then,
  3. gravity dropping a casting bob having a hydraulically stable geometry and circular cross-section at its widest point down through the bore containing the casting composition at a speed less than 1 inch/second to form a continuous tubular film of casting composition on the inside of each bore, said bore having an inside diameter between about 0.02 and 0.12 inches greater than the diameter of the bob at its widest point, introducing vapors of an organic solvent other than said polar organic solvent into said bores during the formation of said film on the inside of each of said bores to maintain a low humidity atmosphere in the bores of between about 1-20 relative humidity in contact with the cast in place film during casting in the bores, and then,
  4. allowing air to contact the film for about 1 to 150 seconds, followed by contacting the film with a deaerated leaching liquid selected from the group consisting of water, water organic and water inorganic effective to leach solvent from the film to form an ultrafiltration membrane on the inside of each module bore.

13. The method of claim 12 wherein the module has flat terminal ends provided with an air-water tight seal.

14. The method of claim 12 wherein the resin coating the filler particles is selected from the group consisting of phenolics, polyglycidyl ethers, polyesters, and allyl resins.

15. The method of claim 12 wherein the open pore module comprises filler particles having an average particle size range between about 40 and 100 microns.

16. The method of claim 12 wherein the casting bob is gravity dropped at a speed up to about 0.325 inches/second and the open pore module comprises filler particles having an average particle size range between about 30 and 500 microns.

17. The method of claim 16 wherein the open pore module comprises resin coated foundry sand particles with a weight-percent range from about 2 to 18 percent of the sand particle weight, the casting composition has a viscosity between about 15,000 and 35,000 cp., the bore diameters are about one-half inch, and the casting bob weighs between about 1.5 and 2.5 ounces.

* * * * *